US012581304B2

(12) United States Patent (10) Patent No.: US 12,581,304 B2
Li (45) Date of Patent: Mar. 17, 2026

(54) VERIFICATION METHODS AND APPARATUSES FOR ELECTRONIC DEVICE INSURANCE

(71) Applicant: Ant Shengxin (Shanghai) Information Technology Co., Ltd., Shanghai (CN)

(72) Inventor: Xiaorui Li, Hangzhou (CN)

(73) Assignee: Ant Shengxin (Shanghai) Information Technology Co., Ltd., Shanghai (CN)

( * ) Notice: Subject to any disclaimer, the term of this patent is extended or adjusted under 35 U.S.C. 154(b) by 333 days.

(21) Appl. No.: 18/492,553

(22) Filed: Oct. 23, 2023

(65) Prior Publication Data

US 2024/0056811 A1 Feb. 15, 2024

Related U.S. Application Data

(63) Continuation of application No. PCT/CN2022/086507, filed on Apr. 13, 2022.

(30) Foreign Application Priority Data

Apr. 23, 2021 (CN) .......................... 202110441291.8

(51) Int. Cl.
*H04W 12/082* (2021.01)
*G06F 21/44* (2013.01)
(Continued)

(52) U.S. Cl.
CPC .......... *H04W 12/082* (2021.01); *G06F 21/44* (2013.01); *G06F 21/6245* (2013.01); *G06Q 40/08* (2013.01); *H04W 12/02* (2013.01)

(58) Field of Classification Search
CPC ..... H04W 12/082; H04W 12/02; G06F 21/44; G06F 21/6245; G06Q 40/08
See application file for complete search history.

(56) References Cited

U.S. PATENT DOCUMENTS 8,918,306 B2 * 12/2014 Cashman ............ H04L 63/0815
703/2
10,515,415 B1 * 12/2019 Davis ..................... G06Q 40/08
(Continued)

FOREIGN PATENT DOCUMENTS

CN 105005426 A 10/2015
CN 105976252 A 9/2016
(Continued)

OTHER PUBLICATIONS

Extended European Search Report in European Appln. No. 22790914. 0, mailed on Mar. 7, 2024, 11 pages.
(Continued)

*Primary Examiner* — Mohamed Barakat
(74) *Attorney, Agent, or Firm* — Fish & Richardson P.C.

(57) ABSTRACT

This specification discloses methods and apparatuses for improving data security. In an implementation, a method includes: in response to receiving an electronic device insurance verification request initiated by a user, displaying an insurance verification page, monitoring a sharing interface of the electronic device, to determine whether screen sharing occurs after the electronic device displays the insurance verification page, and blocking insurance verification in response to determining that the screen sharing occurs.

15 Claims, 15 Drawing Sheets

(51) Int. Cl.
G06F 21/62 (2013.01)
G06Q 40/08 (2012.01)
H04W 12/02 (2009.01)

(56) References Cited

U.S. PATENT DOCUMENTS

| | | | | |
|---|---|---|---|---|
| 11,042,940 | B1 * | 6/2021 | Limas .................... | G06Q 40/08 |
| 2002/0138308 | A1 * | 9/2002 | Harada ................. | G06Q 40/08 |
| | | | | 705/4 |
| 2014/0180725 | A1 * | 6/2014 | Ton-That .............. | G06Q 10/10 |
| | | | | 705/4 |
| 2016/0283586 | A1 | 9/2016 | Thapliyal et al. | |
| 2020/0351374 | A1 * | 11/2020 | Eberle ..................... | G06F 21/31 |
| 2020/0401689 | A1 | 12/2020 | Kim et al. | |
| 2021/0319517 | A1 * | 10/2021 | Aringdale ............. | G06F 3/0482 |
| 2021/0383408 | A1 * | 12/2021 | VanLoo ................. | G16H 40/67 |
| 2022/0270177 | A1 * | 8/2022 | Chintakindi .......... | H04W 4/029 |

FOREIGN PATENT DOCUMENTS

| | | | |
|---|---|---|---|
| CN | 106060126 | A | 10/2016 |
| CN | 106973020 | A | 7/2017 |
| CN | 109064341 | A | 12/2018 |
| CN | 109460732 | A | 3/2019 |
| CN | 110689445 | A | 1/2020 |
| CN | 111325632 | A | 1/2020 |
| CN | 111475840 | A | 7/2020 |
| CN | 111523109 | A | 8/2020 |
| CN | 112100424 | A | 12/2020 |
| CN | 112330466 | A | 2/2021 |
| CN | 112597931 | A | 4/2021 |
| CN | 112686763 | | 4/2021 |
| CN | 113077354 | A | 7/2021 |
| CN | 113706324 | | 11/2021 |
| EP | 2760177 | | 7/2014 |
| WO | 2017201950 | A | 11/2017 |
| WO | WO 2020/139194 | | 7/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Preliminary Report on Patentability in International Appln. No. PCT/CN2022/086507, mailed on Oct. 24, 2023, 11 pages (with English translation).

International Search Report and Written Opinion in International Appln. No. PCT/CN2022/086507, mailed on Jul. 7, 2022, 17 pages (with English translation).

Li et al., "Analysis of medical insurance fraud characteristics," China Social Security, Issue 2, Feb. 1, 2015, 18 pages (with English machine translation).

Nakamoto, "Bitcoin: A Peer-to-Peer Electronic Cash System," www.bitcoin.org, 2008, 9 pages.

* cited by examiner

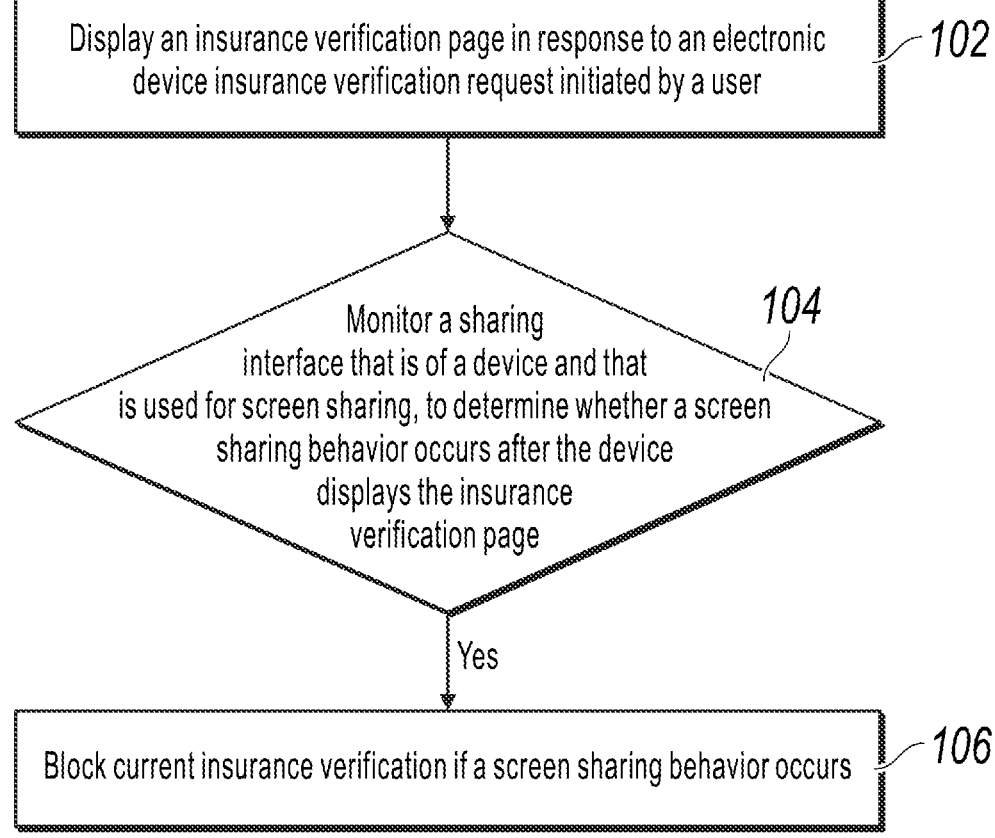

Display an insurance verification page in response to an electronic device insurance verification request initiated by a user — 102

Monitor a sharing interface that is of a device and that is used for screen sharing, to determine whether a screen sharing behavior occurs after the device displays the insurance verification page — 104

Yes

Block current insurance verification if a screen sharing behavior occurs — 106

FIG. 1

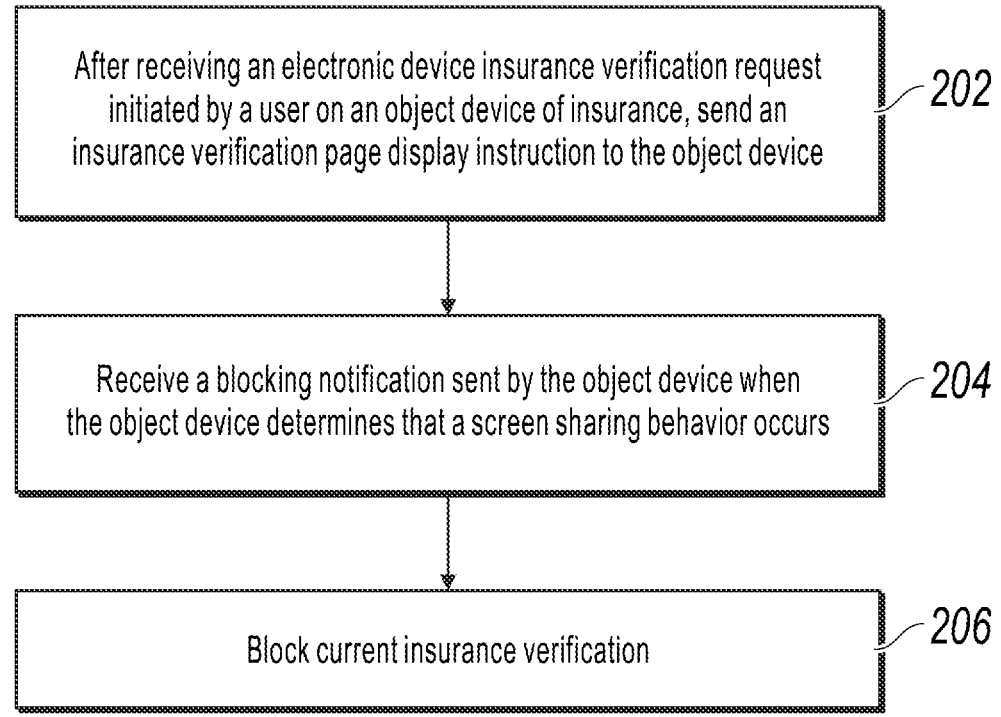

After receiving an electronic device insurance verification request initiated by a user on an object device of insurance, send an insurance verification page display instruction to the object device ⌐202

Receive a blocking notification sent by the object device when the object device determines that a screen sharing behavior occurs ⌐204

Block current insurance verification ⌐206

Verification apparatus for electronic device insurance

Verification request receiving unit   *1510*

Blocking notificationreceiving unit   *1520*

Insurance verification receiving unit   *1530*

VERIFICATION METHODS AND APPARATUSES FOR ELECTRONIC DEVICE INSURANCE

CROSS-REFERENCE TO RELATED APPLICATIONS

This application is a continuation of PCT Application No. PCT/CN2022/086507, filed on Apr. 13, 2022, which claims priority to Chinese Patent Application No. 202110441291.8, filed on Apr. 23, 2021, and each application is hereby incorporated by reference in its entirety.

TECHNICAL FIELD

This specification relates to the field of Internet technologies, and in particular, to verification methods and apparatuses for electronic device insurance.

BACKGROUND

With continuous development of Internet technologies, more insurance services can be implemented through a network. For example, after a user purchases a mobile phone, the user can process a broken screen insurance for the mobile phone online. However, a malicious insurance fraud exists in an actual insurance process. How to detect and intercept a malicious insurance fraud operation has become a focus of attention in the industry.

SUMMARY

In view of this, this specification provides verification methods and apparatuses for electronic device insurance.

Specifically, this specification is implemented by using the following technical solutions: A verification method for electronic device insurance is provided, applied to an object device of insurance, and including: displaying an insurance verification page in response to an electronic device insurance verification request initiated by a user; monitoring a sharing interface that is of the device and that is used for screen sharing, to determine whether a screen sharing behavior occurs after the device displays the insurance verification page; and blocking current insurance verification if a screen sharing behavior occurs.

A verification method for electronic device insurance is provided, applied to an object device of insurance, and including: displaying an insurance verification page in response to an electronic device insurance verification request initiated by a user; determining whether a screenshot image is stored in an album of the device and a generation moment of the screenshot image is later than a display moment of the insurance verification page; and blocking current insurance verification if a screenshot image is stored in the album of the device and a generation moment of the screenshot image is later than the display moment of the insurance verification page.

A verification method for electronic device insurance is provided, applied to a server, and including: after receiving an electronic device insurance verification request initiated by a user on an object device of insurance, sending an insurance verification page display instruction to the object device, so that the object device displays an insurance verification page and monitors a sharing interface that is of the device and that is used for screen sharing, to determine whether a screen sharing behavior occurs after the device displays the insurance verification page; receiving a blocking notification sent by the object device when the object device determines that a screen sharing behavior occurs; and blocking current insurance verification.

A verification apparatus for electronic device insurance is provided, applied to an object device of insurance, and including: a display unit, configured to display an insurance verification page in response to an electronic device insurance verification request initiated by a user; a monitoring unit, configured to monitor a sharing interface that is of the device and that is used for screen sharing, to determine whether a screen sharing behavior occurs after the device displays the insurance verification page; and a blocking unit, configured to block current insurance verification if a screen sharing behavior occurs.

A verification apparatus for electronic device insurance is provided, applied to an object device of insurance, and including: a response unit, configured to display an insurance verification page in response to an electronic device insurance verification request initiated by a user; a determining unit, configured to determine whether a screenshot image is stored in an album of the device and a generation moment of the screenshot image is later than a display moment of the insurance verification page; and an execution unit, configured to block current insurance verification if a screenshot image is stored in the album of the device and a generation moment of the screenshot image is later than the display moment of the insurance verification page.

A verification apparatus for electronic device insurance is provided, applied to a server, and including: a verification request receiving unit, configured to: after receiving an electronic device insurance verification request initiated by a user on an object device of insurance, send an insurance verification page display instruction to the object device, so that the object device displays an insurance verification page and monitors a sharing interface that is of the device and that is used for screen sharing, to determine whether a screen sharing behavior occurs after the device displays the insurance verification page; a blocking notification receiving unit, configured to receive a blocking notification sent by the object device when the object device determines that a screen sharing behavior occurs; and an insurance verification blocking unit, configured to block current insurance verification.

A verification apparatus for electronic device insurance is provided, including: a processor; and a memory, configured to store machine-executable instructions; where machine-executable instructions that are stored in the memory and that correspond to electronic device insurance verification logic are read and executed, to enable the processor to perform the following operations: displaying an insurance verification page in response to an electronic device insurance verification request initiated by a user; monitoring a sharing interface that is of the device and that is used for screen sharing, to determine whether a screen sharing behavior occurs after the device displays the insurance verification page; and blocking current insurance verification if a screen sharing behavior occurs.

A verification apparatus for electronic device insurance is provided, applied to an object device of insurance, and including: a processor; and a memory, configured to store machine-executable instructions; where machine-executable instructions that are stored in the memory and that correspond to electronic device insurance verification logic are read and executed, to enable the processor to perform the following operations: displaying an insurance verification page in response to an electronic device insurance verification request initiated by a user; determining whether a screenshot image is stored in an album of the device and a generation moment of the screenshot image is later than a display moment of the insurance verification page; and blocking current insurance verification if a screenshot image is stored in the album of the device and a generation moment of the screenshot image is later than the display moment of the insurance verification page.

A verification apparatus for electronic device insurance is provided, applied to an object device of insurance, and including: a processor; and a memory, configured to store machine-executable instructions; where machine-executable instructions that are stored in the memory and that correspond to electronic device insurance verification logic are read and executed, to enable the processor to perform the following operations: after receiving an electronic device insurance verification request initiated by a user on the object device of insurance, sending an insurance verification page display instruction to the object device, so that the object device displays an insurance verification page and monitors a sharing interface that is of the device and that is used for screen sharing, to determine whether a screen sharing behavior occurs after the device displays the insurance verification page; receiving a blocking notification sent by the object device when the object device determines that a screen sharing behavior occurs; and blocking current insurance verification.

In an embodiment of this specification, an implementation is as follows: An object device of insurance can display an insurance verification page in response to an electronic device insurance verification request initiated by a user; monitor a sharing interface that is of the device and that is used for screen sharing, to determine whether a screen sharing behavior occurs after the device displays the insurance verification page; and block current insurance verification when determining that a screen sharing behavior occurs.

According to the above-mentioned method, an insurance fraud operation performed through screen sharing and page sharing can be detected and intercepted, to avoid a malicious insurance fraud of an unauthorized user, and attack the network black market.

BRIEF DESCRIPTION OF DRAWINGS

FIG. 1 is a schematic flowchart illustrating a verification method for electronic device insurance, according to an example embodiment of this specification;

FIG. 2 is a schematic flowchart illustrating another verification method for electronic device insurance, according to an example embodiment of this specification;

DESCRIPTION OF EMBODIMENTS

Figure 3:
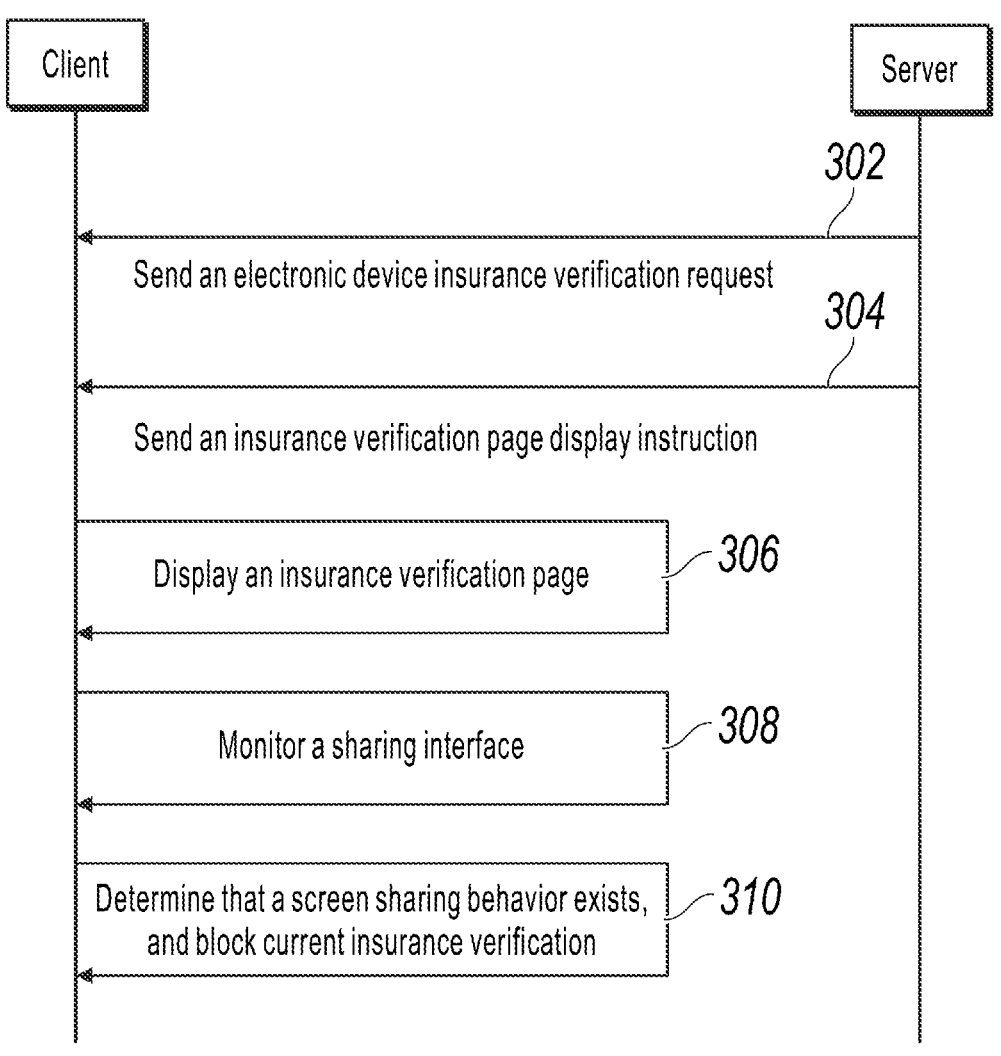
FIG. 3 is a schematic diagram illustrating multi-party interaction of a verification method for electronic device insurance, according to an example embodiment of this specification.

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with this specification. On the contrary, the embodiments are merely examples of apparatuses and methods that are described in the appended claims in details and consistent with some aspects of this specification.

The terms used in this specification are merely for illustrating specific embodiments, and are not intended to limit this specification. The terms "a", "said", and "the" of singular forms used in this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in this specification to describe various types of information, the information is not limited to the terms. These terms are merely used to differentiate between information of the same type. For example, without departing from the scope of this specification, first information can also be referred to as second information, and similarly, the second information can be referred to as the first information. Depending on the context, for example, the word "if" used here can be explained as "while", "when", or "in response to determining".

With continuous development of Internet technologies, more insurance services can be implemented through a network. While bringing convenience to people's life, online insurance also provides an opportunity for some users to make a malicious insurance fraud.

A mobile phone broken screen insurance is used as an example. In a related technology, when an insurance is applied for, an insurance verification page is usually displayed on an insured mobile phone, and then a user captures an image of the insured mobile phone and sends the image to a server. If the server detects that a model of a mobile phone in the image is consistent with a model of the insured mobile phone, a screen of the mobile phone is intact and not damaged, and verification of the insurance verification page in the image also succeeds, the broken screen insurance is processed for the user. However, the user may share the insurance verification page on the insured mobile phone to another undamaged mobile phone of a same model by using a screenshot, etc. As such, the server mistakenly considers the undamaged mobile phone as the insured mobile phone, to achieve an insurance fraud.

This specification provides a verification method for electronic device insurance, so that an insurance fraud operation performed through screen sharing and page sharing can be detected and intercepted, to avoid a malicious insurance fraud of an unauthorized user, and attack the network black market.

FIG. 1 is a schematic flowchart illustrating a verification method for electronic device insurance, according to an example embodiment of this specification.

The method can be applied to an object device of insurance, an insurance client can be installed on the object device, and the insurance client can be application software, a mini program, etc. This is not specially limited.

The method can include the following steps: Step 102: Display an insurance verification page in response to an electronic device insurance verification request initiated by a user. Step 104: Monitor a sharing interface that is of the device and that is used for screen sharing, to determine whether a screen sharing behavior occurs after the device displays the insurance verification page. Step 106: Block current insurance verification if a screen sharing behavior occurs.

The steps are described in detail below.

In this embodiment, the user can initiate the electronic device insurance verification request on the insurance client on the object device (that is, an insured device). The electronic device can be a mobile phone, a tablet computer, a smartwatch, etc. An insurance type can be a broken screen insurance, an accident insurance, or another type of insurance. This is not specially limited.

The user can tap a related button on the client to initiate the electronic device insurance verification request. Certainly, the insurance verification request can alternatively be initiated in another method. This is not specially limited.

After the user initiates the insurance verification request, the object device can monitor the sharing interface that is of the device and that is used for screen sharing. The sharing interface can be an interface used by a screen sharing function in a user chatting interface provided by application software, or can be an interface for taking a screenshot, or can be another interface that can implement screen sharing. The object device can monitor these sharing interfaces, to determine whether a screen sharing behavior occurs after the device displays the insurance verification page.

For example, if the object device detects that the sharing interface is invoked, the object device can determine that a screen sharing behavior occurs on the device.

For another example, the object device can further detect upstream traffic of the device within a predetermined time period after the electronic device insurance verification request is initiated; and after it is detected that the upstream traffic exceeds a traffic threshold and it is detected that the sharing interface is invoked, it can be determined that a screen sharing behavior occurs on the device. The predetermined time period can be 5 minutes or 10 minutes, and can be set based on an actual scenario. The traffic threshold can also be set based on an actual scenario. This is not specially limited.

After determining that the traffic sharing behavior occurs on the device, the object device can block current insurance verification. For example, the interface used for screen sharing can be set, and a screen sharing display can be interfered with. A specific blocking method is described in the following embodiments.

It can be seen from the above-mentioned description that, in an embodiment of this specification, the object device of insurance can display the insurance verification page in response to the electronic device insurance verification request initiated by the user; monitor the sharing interface that is of the device and that is used for screen sharing, to determine whether a screen sharing behavior occurs after the device displays the insurance verification page; and block current insurance verification when determining that a screen sharing behavior occurs.

According to the above-mentioned method, the screen sharing behavior of the device can be identified by monitoring the sharing interface, and insurance verification is blocked after it is determined that screen sharing occurs, so that an insurance fraud operation performed through screen sharing and page sharing can be detected and intercepted, to avoid a malicious insurance fraud of an unauthorized user, and attack the network black market.

The following describes another verification method for electronic device insurance provided in this specification. FIG. 2 is a schematic flowchart illustrating another verification method for electronic device insurance, according to an example embodiment of this specification. The method can be applied to a server, and includes the following steps: Step 202: After receiving an electronic device insurance verification request initiated by a user on an object device of insurance, send an insurance verification page display instruction to the object device. Step 204: Receive a blocking notification sent by the object device when the object device determines that a screen sharing behavior occurs. Step 206: Block current insurance verification.

The steps are described in detail below.

In this embodiment, the user can initiate the electronic device insurance verification request on the object device, and an insurance client of the object device can send the request to the server. After receiving the request, the server can send the insurance verification page display instruction to the object device. After receiving the instruction, the object device can display the insurance verification page to the user, and monitor an interface that is of the device and that is used for screen sharing, to determine whether a screen sharing behavior occurs. For details, references can be made to the above-mentioned embodiment.

After the object device determines that a screen sharing behavior occurs, the object device can send the blocking notification to the server. After receiving the blocking notification, the server can block current insurance verification. A specific blocking method is described in the following embodiments.

It can be seen from the above-mentioned description that, in an embodiment of this specification, after receiving the electronic device insurance verification request initiated by the user on the object device, the server can send the insurance verification page display instruction to the object device, so that the object device displays the insurance verification page; monitors a sharing interface for screen sharing, to determine whether a screen sharing behavior exists; when a screen sharing behavior exists, receives a blocking notification sent by a client; and blocks current insurance verification.

According to the method, an insurance fraud behavior performed based on screen sharing and page sharing can be identified, and the insurance fraud behavior is blocked, to avoid a malicious insurance fraud behavior of an unauthorized user, and attack the network black market.

The following describes another verification method for electronic device insurance provided in this specification. This embodiment provides descriptions from a perspective of interaction between a server and an insurance client of an object device. FIG. 3 is a schematic diagram illustrating multi-party interaction of a verification method for electronic device insurance, according to an example embodiment of this specification. The method can include the following steps: Step 302: The client sends an electronic device insurance verification request to the server.

Step 304: The server sends an insurance verification page display instruction to the client.

Step 306: The client displays an insurance verification page.

In this embodiment, the insurance client of the object device can display an insurance related page, and the page can display description information of different insurance types such as a broken screen insurance and an accident insurance. If a user wants to apply for a certain insurance type, the user can tap an insurance button corresponding to the insurance type, to initiate an insurance request and perform insurance verification. In this embodiment, the following provides descriptions by using a mobile phone broken screen insurance as an example.

The client can send, to the server, the insurance verification request initiated by the user. After receiving the request, the server can send the insurance verification page display instruction to the server. After receiving the instruction, the client can display the insurance verification page. The user can capture a device image of the object device based on the insurance verification page by using another device (for example, another mobile phone, which is referred to as a verification auxiliary device below).

In an example, a graphic code, for example, a two-dimensional code, can be displayed on the insurance verification page. Reference can be made to a page shown in FIG. 4. The user can enable the verification auxiliary device to scan the two-dimensional code to capture the device image of the object device.

The two-dimensional code includes data such as a verification identifier, a user account, insurance information, and a device identifier. After scanning the two-dimensional code, the verification auxiliary device can parse the two-dimensional code. If the verification identifier is obtained through parsing, the verification auxiliary device can invoke a camera of the verification auxiliary device to capture an image; and after the image is captured, send, to the server, the captured image and the data such as the user account, the insurance information, and the device identifier that are obtained through parsing in the two-dimensional code. The server can determine a corresponding insurance request based on the information, and perform insurance verification. The two-dimensional code can alternatively be dynamically updated, for example, refreshed once every minute.

Figure 5:
FIG. 5 is a schematic diagram illustrating a page of another object device, according to an example embodiment of this specification.

In another example, the insurance verification page can not only display the two-dimensional code, but also display a verification token. Reference can be made to a page shown in FIG. 5. In FIG. 5, "964572" is a verification token. The verification token can be added by the server to the insurance verification page display instruction and delivered to the client, can be a code randomly generated by the server, or can be a code generated based on information such as a timestamp. In addition to a digital form, the verification token can include a character, etc. This is not specially limited. In addition, the verification token can alternatively be dynamically updated. For example, the verification token can be updated once every minute, and the server can periodically deliver the updated verification token to the client.

The verification auxiliary device can also scan the two-dimensional code to capture the device image of the object device, and the device image further includes the verification token. In addition to performing insurance verification based on information included in the two-dimensional code, the server further performs insurance verification with reference to the verification token identified from the device image.

Figure 4:
FIG. 4 is a schematic diagram illustrating a page of an object device, according to an example embodiment of this specification.

Certainly, the above-mentioned example and the pages in FIG. 4 and FIG. 5 are merely example descriptions. In an actual case, another method can also be used. For example, the verification token can also be included in the two-dimensional code. After scanning the two-dimensional code, the auxiliary device automatically sends the verification token to the server. Examples are not listed one by one in this embodiment.

In this embodiment, after receiving the device image sent by the verification auxiliary device, the server can perform insurance verification based on the device image when determining that a screen sharing behavior does not exist on the object device, for example, verify whether a model of a device in the device image is consistent with a model of the object device and verify whether a screen of the device is damaged. For details, references can be made to a related technology. Details are omitted in this embodiment. A method for determining whether a screen sharing behavior exists on the object device is described in the following steps.

Step 308: The client monitors a sharing interface.

Step 310: The client determines that a screen sharing behavior exists, and blocks current insurance verification.

In this embodiment, the client can monitor the sharing interface, to determine whether a screen sharing behavior exists on the device.

There can be a plurality of monitoring opportunities.

For example, if the user performs screen sharing with another device through some software before initiating the insurance verification request, and keeps a screen shared state in an insurance process, after detecting that the user initiates the insurance verification request or after displaying the insurance verification page to the user, the client can monitor whether the sharing interface is invoked.

For another example, if the user initiates the insurance verification request, screen sharing is performed with the another device only after the client displays the insurance verification page. In this case, the user usually needs to switch the insurance client to running in the background, and then other software is accessed to enable screen sharing. After screen sharing is enabled, the insurance client can be switched from running in the background to running in the foreground. Then, each time the server detects that the insurance client is switched from running in the background to running in the foreground, the server can monitor whether the sharing interface is invoked. Adopting this method can prevent the user from avoiding detection of the client by "suppressing background applications", and can improve accuracy of identifying an insurance fraud operation can be improved.

Certainly, in addition to the above-mentioned methods, the client can periodically monitor, based on a predetermined time period, whether the sharing interface is invoked, or can use another method. Examples are not listed one by one in this embodiment.

In this embodiment, after the client detects that the sharing interface is invoked, it can be determined that a screen sharing behavior exists on the device. Alternatively, after it is detected that the sharing interface is invoked and it is detected that upstream traffic of the device after the electronic device insurance verification request is initiated reaches the traffic threshold, it can be determined that a screen sharing behavior occurs on the device.

In this embodiment, after it is determined that a screen sharing behavior occurs on the device, current insurance verification can be blocked, and there can be a plurality of blocking measures.

In one example, the client can interfere with a screen sharing operation.

For example, for an Android operating system, the server can set an interface parameter of screen sharing, to interfere with a screen sharing display. For example, a related parameter can be adjusted, so that a black screen display is output on a shared device, or a white screen display, a random code, etc. can be output. Therefore, the user cannot successfully share, with another device, a screen of an object device on which an insurance verification page is displayed. Therefore, an insurance fraud cannot be made by using the methods.

In another example, the client does not have to interfere with the screen sharing operation, but interfere with the insurance verification page, to affect the screen sharing operation from a side. In addition, in the method, an operating system of the object device is not limited. For example, the method can be applied to an Android system and an IOS system.

In this example, the client can output blocking information on the insurance verification page. The blocking information can cover a part of the insurance verification page, and there can be various specific forms of blocking information.

Figure 6:
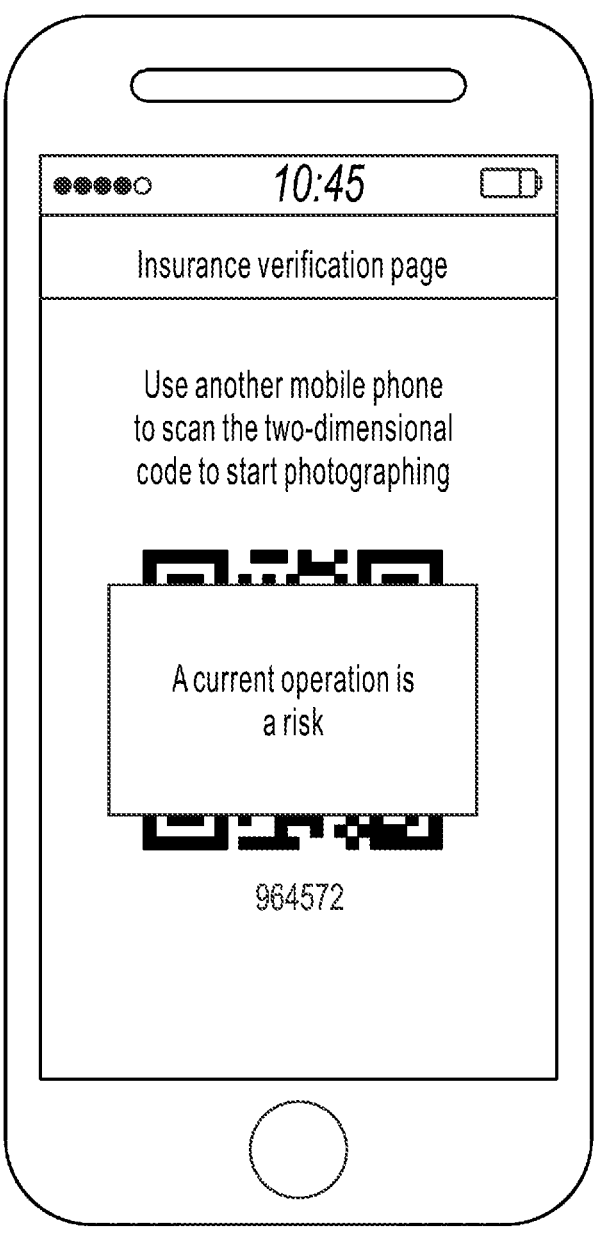
FIG. 6 is a schematic diagram illustrating a page of another object device, according to an example embodiment of this specification.

For example, the blocking information can cover a graphic code used for photographing. Referring to the page shown in FIG. 6, the blocking information can be a pop-up window. The pop-up window can cover the two-dimensional code on the insurance verification page, and the user cannot scan the two-dimensional code for photographing, to block insurance verification. In addition, the blocking information can further include a reminder for reminding the user, for example, "A current operation is a risk" shown in FIG. 6.

Figure 7:
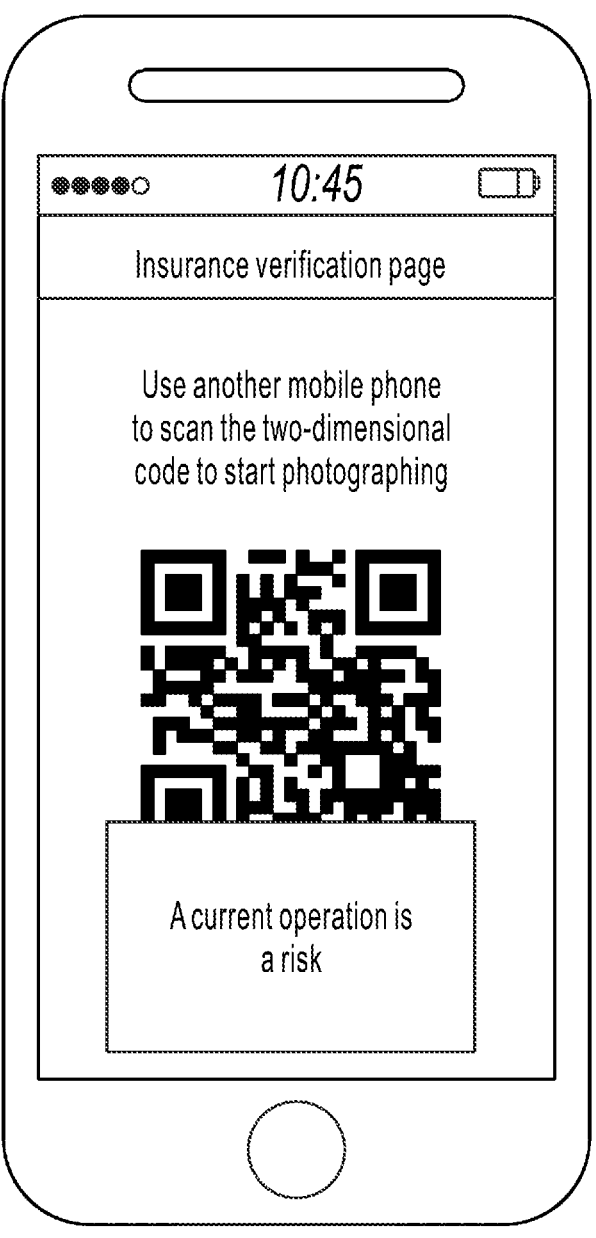
FIG. 7 is a schematic diagram illustrating a page of another object device, according to an example embodiment of this specification.

For another example, the blocking information can alternatively cover the verification token on the insurance verification page. Referring to FIG. 7, the verification token "964572" actually exists below the two-dimensional code in FIG. 7, but the verification token is covered by the blocking information. In this case, even if the user captures the device image of the object device, the server cannot identify the verification token from the device image, to block current insurance verification.

Figure 8:
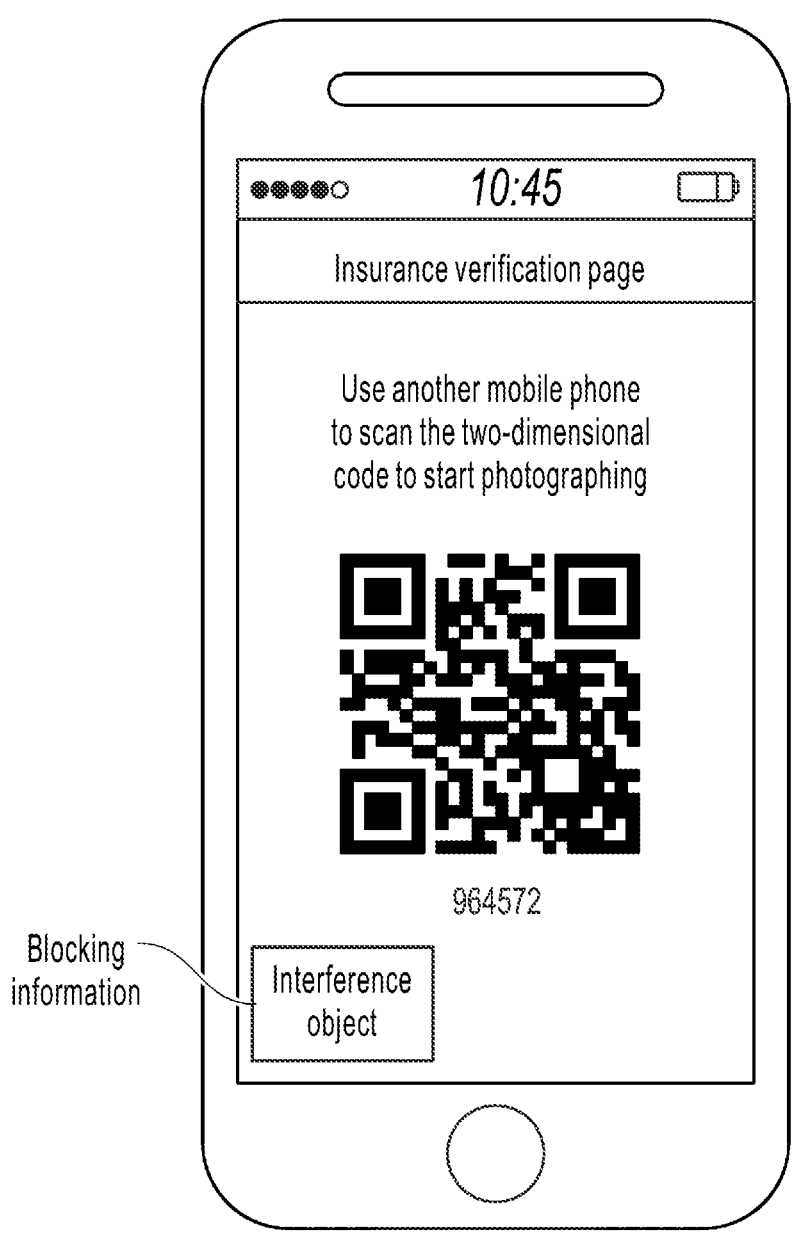
FIG. 8 is a schematic diagram illustrating a page of another object device, according to an example embodiment of this specification.

For another example, the blocking information can alternatively cover another location on the insurance verification page. Referring to FIG. 8, the blocking information can be an interference object at a lower left corner of the page, and can be an identifier, a specific pattern, etc. The blocking information does not cover the two-dimensional code or the verification token. The user can still use the verification auxiliary device to scan the two-dimensional code to capture the device image of the object device, and upload the device image to the server. After receiving the device image, the server can first detect whether blocking information exists in the image. If blocking information exists in the image, the server can determine that insurance verification fails, to block current insurance verification.

According to this method, the blocking information does not block the two-dimensional code or the verification token. In addition, the blocking information can be designed in a form that is not easy to be perceived by the user. As such, the insurance verification method is not easy to be perceived by the user, to help avoid a case in which a malicious user specially uses some methods to bypass verification to make an insurance fraud.

Certainly, the above-mentioned example is merely an example description, and accompanying drawings of the related page are merely used as a reference, and are not intended to limit this specification.

In this embodiment, in addition to blocking insurance verification by using the client, insurance verification can be blocked by using the server. In actual applications, either of the methods can be selected. Certainly, both methods can be used, and an execution sequence of the two methods is not limited when both methods are used. The following describes a method for blocking insurance verification by using the server.

In this embodiment, after determining that a screen sharing behavior exists on the device, the client can send a blocking notification to the server. After receiving the blocking notification, the server can take a corresponding action to block current insurance verification.

For example, after receiving the blocking notification, the server can determine that all device images received in the predetermined time period are invalid, and determine that corresponding insurance verification fails. The predetermined time period can be one hour, two hours, etc. after the blocking notification is received. This is not specially limited.

For another example, it is assumed that there is still a dynamically updated verification token on the insurance verification page. After receiving the blocking notification sent by the client, the server does not update the verification token to the client. In this case, a verification token in an image captured by the auxiliary device is likely to have expired and have been invalid, and the device image is also determined as invalid, so that insurance verification fails.

Certainly, the server can also block current insurance verification in another method, or can block current insurance verification by combining the two methods. Examples are not listed one by one in this embodiment.

In this embodiment, after current insurance verification is blocked, the client can further continue to monitor the sharing interface. After it is detected that the sharing interface is no longer invoked, it can be determined that no screen sharing behavior exists on the device, and restoration is performed for the above-mentioned blocking, for example, the blocking information is no longer output on the insurance verification page.

In this embodiment, if the insurance client of the object device monitors the sharing interface in step 308 and determines that a screen sharing behavior does not occur on the device, current insurance verification does not need to be blocked, and the blocking notification does not need to be sent to the server. Insurance verification can be performed in a conventional method. For details, references can be made to a related technology. Details are omitted in this embodiment.

It can be seen from the above-mentioned description that, in an embodiment of this specification, after it is determined that a screen sharing behavior occurs on the object device, both the client and the server can block current insurance verification. For example, the client can interfere with the screen sharing display, or output the blocking information on the insurance verification page, and the server can stop updating the insurance verification page.

According to the above-mentioned method, after it is detected that a screen sharing behavior occurs on the object device, interception is performed not only from a perspective of the client, but also from a perspective of the server, to better intercept the insurance fraud operation performed based on screen sharing and page sharing, and improve security.

Figure 9:
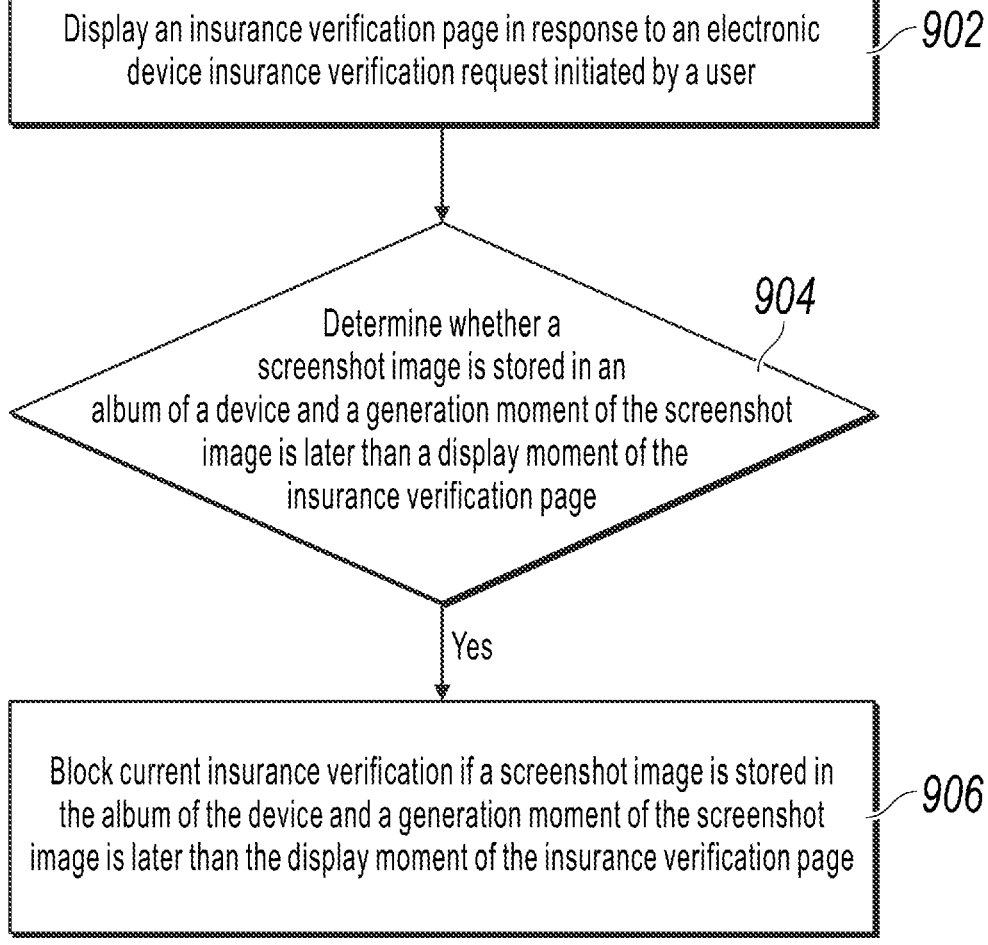
FIG. 9 is a schematic flowchart illustrating another verification method for electronic device insurance, according to an example embodiment of this specification.

The following describes another verification method for electronic device insurance provided in this specification. FIG. 9 is a schematic flowchart illustrating another verification method for electronic device insurance, according to an example embodiment of this specification. The method is applied to an object device, and includes the following steps: Step 902: Display an insurance verification page in response to an electronic device insurance verification request initiated by a user. Step 904: Determine whether a screenshot image is stored in an album of the device and a generation moment of the screenshot image is later than a display moment of the insurance verification page. Step 906: Block current insurance verification if a screenshot image is stored in the album of the device and a generation moment of the screenshot image is later than the display moment of the insurance verification page.

The steps are described in detail below.

In this embodiment, the user can initiate the electronic device insurance verification request on an insurance client of the object device. After receiving the request, the client can display the insurance verification page. For details, references can be made to the above-mentioned embodiments.

The client can determine whether the screenshot image is stored in the album of the device and the generation moment of the screenshot image is later than the display moment of the insurance verification page. For example, the client can identify, from a related path, the album that stores the image, identify the screenshot image based on an identifier or a format of the screenshot image, and determine whether a screenshot image whose generation moment is later than the display moment of the insurance verification page exists. If the screenshot image exists, it indicates that a screenshot of the image is probably intentionally taken by the user for an insurance fraud. In this case, a server can block current insurance verification. For example, the client can send a blocking notification to the server, so that the server performs a corresponding blocking operation. For details, references can be made to the above-mentioned embodiments. Details are omitted here for simplicity.

It can be seen from the above-mentioned description that, in an embodiment of this specification, the client can further determine whether a screenshot image whose generation moment is later than the display moment of the insurance verification page is stored in the album of the device, and block current insurance verification when an image is stored.

According to the method, it can be identified that the user makes a malicious insurance fraud by taking a screenshot, and the malicious insurance fraud can be further intercepted and blocked.

Corresponding to the embodiments of the verification method for electronic device insurance, this specification further provides an embodiment of a verification apparatus for electronic device insurance.

Figure 10:
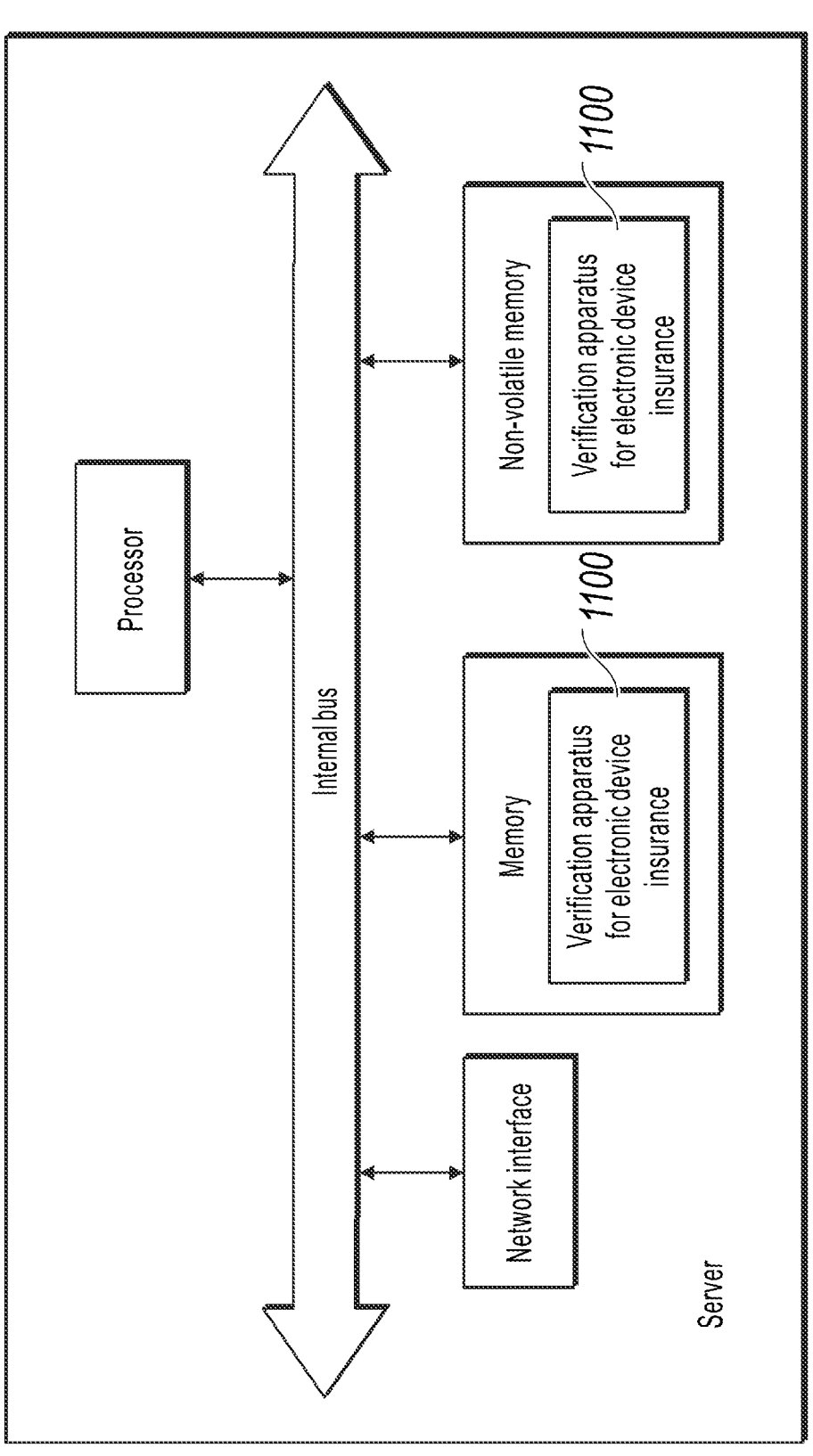
FIG. 10 is a diagram illustrating a hardware structure of a terminal device in which a verification apparatus for electronic device insurance is located, according to an example embodiment of this specification.

The embodiment of the verification apparatus for electronic device insurance in this specification can be applied to a server. The apparatus embodiment can be implemented by using software, or can be implemented by using hardware or a combination of software and hardware. A software implementation is used as an example. As a logical apparatus, the apparatus is formed by reading a corresponding computer program instruction in a non-volatile memory to a memory by a processor of a terminal device or a server in which the apparatus is located. In terms of hardware, FIG. 10 is a diagram illustrating a hardware structure of a terminal device in which a verification apparatus for electronic device insurance is located, according to this specification. In addition to a processor, a memory, a network interface, and a non-volatile memory shown in FIG. 10, the terminal device or the server in which the apparatus in this embodiment is located usually can include other hardware based on an actual function of the terminal device or the server. Details are omitted here for simplicity.

Figure 11:
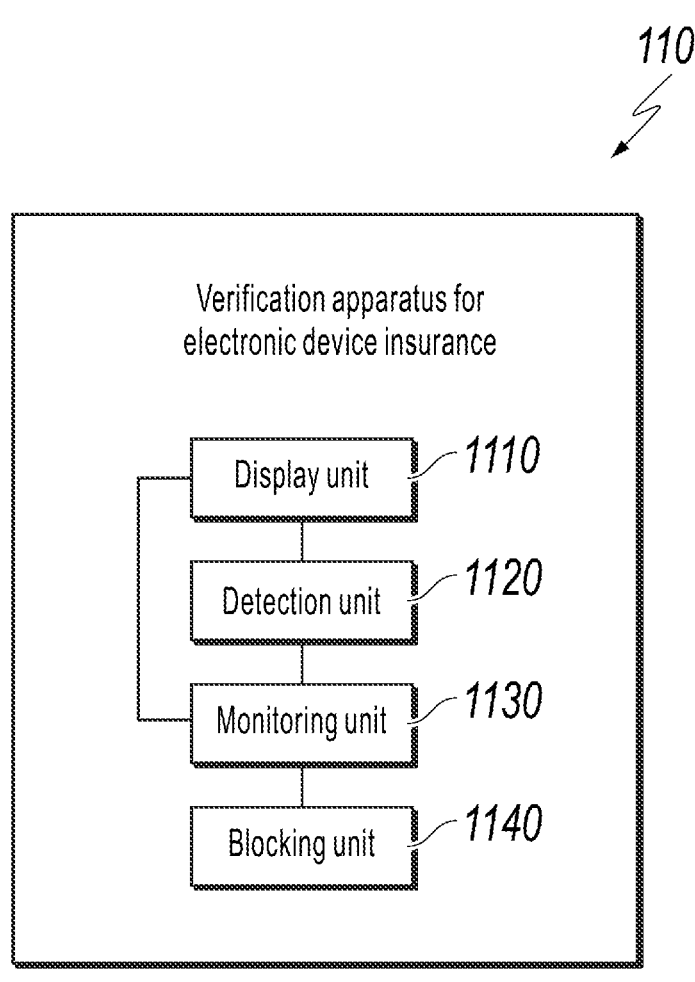
FIG. 11 is a block diagram illustrating a verification apparatus for electronic device insurance, according to an example embodiment of this specification.

FIG. 11 is a block diagram illustrating a verification apparatus for electronic device insurance, according to an example embodiment of this specification.

Referring to FIG. 11, a verification apparatus for electronic device insurance 1100 can be applied to the terminal device shown in FIG. 10, and includes a display unit 1110, a detection unit 1120, a monitoring unit 1130, and a blocking unit 1140.

The display unit 1110 is configured to display an insurance verification page in response to an electronic device insurance verification request initiated by a user. The monitoring unit 1130 is configured to monitor a sharing interface that is of the device and that is used for screen sharing, to determine whether a screen sharing behavior occurs after the device displays the insurance verification page. The blocking unit 1140 is configured to block current insurance verification if a screen sharing behavior occurs.

Optionally, the monitoring unit 1130 is configured to: after it is detected that the interface that is of the device and that is used for screen sharing is invoked, determine that a screen sharing behavior occurs after the device displays the insurance verification page.

Optionally, the detection unit 1120 is configured to: detect upstream traffic of the device within a predetermined time period after the electronic device insurance verification request is initiated; and after it is detected that the interface that is of the device and that is used for screen sharing is invoked and it is detected that the upstream traffic exceeds a traffic threshold, determine that a screen sharing behavior occurs after the device displays the insurance verification page.

Optionally, the blocking unit 1140 is configured to output blocking information on the insurance verification page.

Optionally, the blocking information covers a part of the insurance verification page.

Optionally, the blocking unit 1140 is configured to adjust a specified parameter of the sharing interface, to interfere with a screen sharing display.

Optionally, the blocking unit 1140 is configured to send a blocking notification to a server, so that the server stops updating the insurance verification page after receiving the blocking notification.

Optionally, a monitoring opportunity of the sharing interface includes one or more of the following: a moment after the insurance verification page is displayed; and a moment after it is detected that a client that is on the device and that is configured to implement electronic device insurance verification switches from running in the background to running in the foreground.

Optionally, the sharing interface includes an interface for sharing a screen and/or an interface for taking a screenshot.

Figure 12:
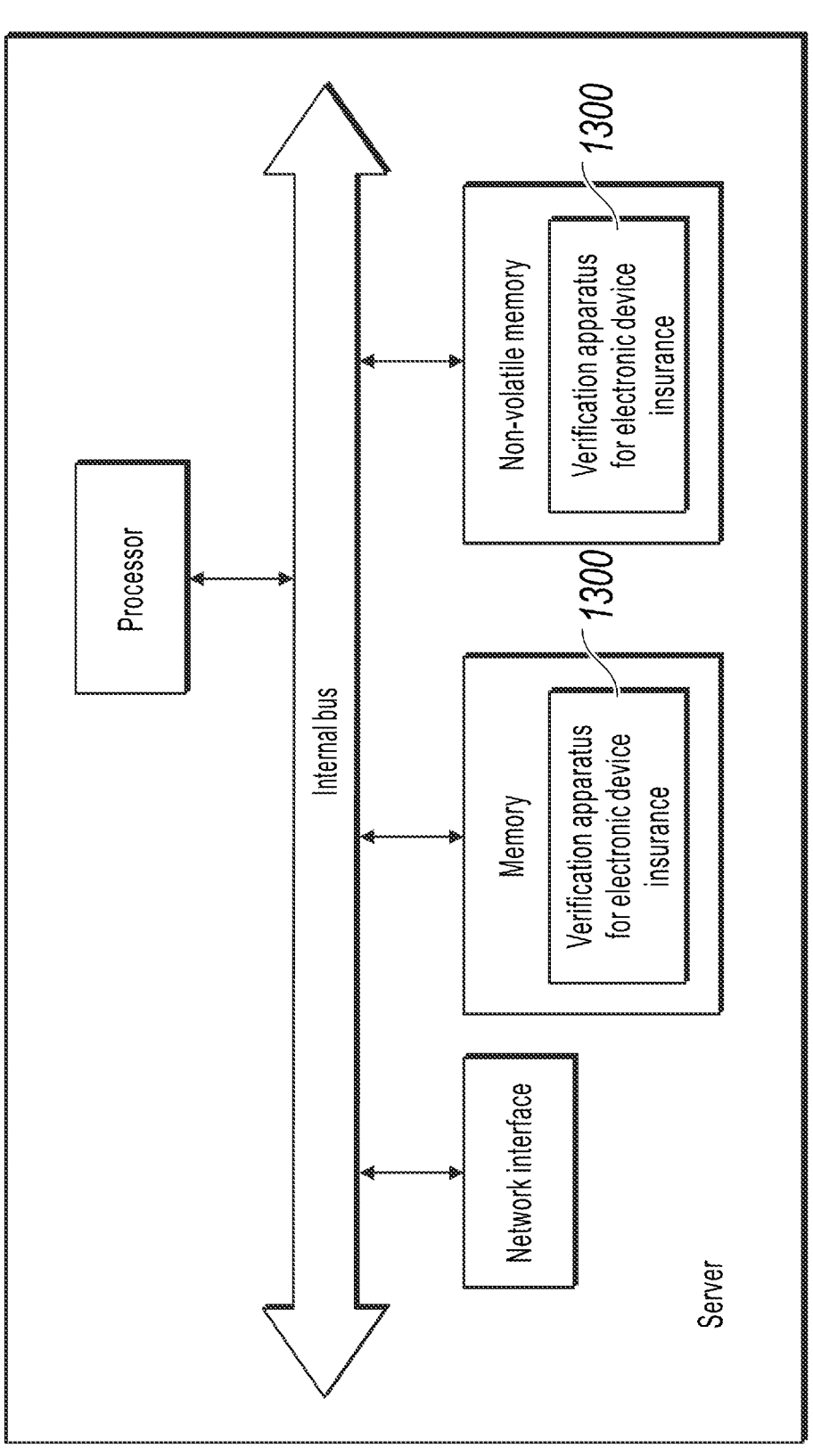
FIG. 12 is a diagram illustrating a hardware structure of a terminal device in which another verification apparatus for electronic device insurance is located, according to an example embodiment of this specification.

FIG. 12 is a diagram illustrating a hardware structure of a terminal device in which another verification apparatus for electronic device insurance is located, according to an example embodiment of this specification.

Figure 13:
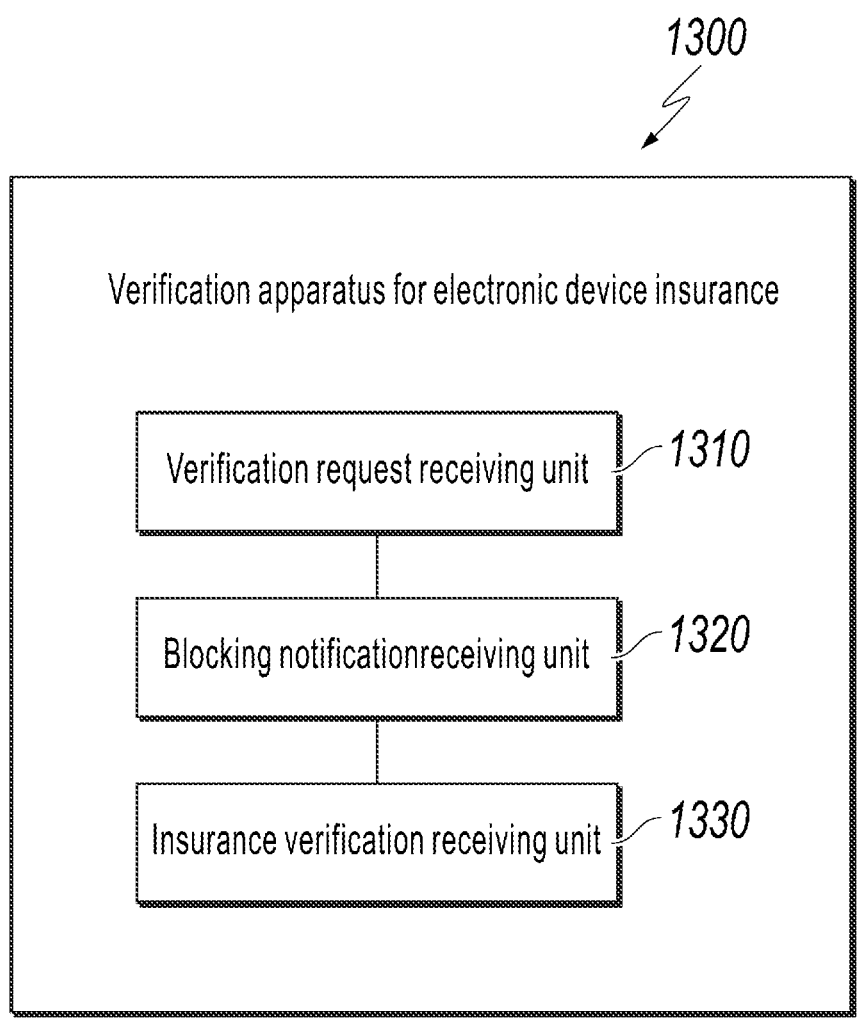
FIG. 13 is a block diagram illustrating another verification apparatus for electronic device insurance, according to an example embodiment of this specification.

FIG. 13 is a block diagram illustrating another verification apparatus for electronic device insurance, according to an example embodiment of this specification.

Referring to FIG. 13, a verification apparatus for electronic device insurance 1300 can be applied to a server shown in FIG. 12, and includes a response unit 1310, a determining unit 1320, and an execution unit 1330.

The response unit 1310 is configured to display an insurance verification page in response to an electronic device insurance verification request initiated by a user. The determining unit 1320 is configured to determine whether a screenshot image is stored in an album of the device and a generation moment of the screenshot image is later than a display moment of the insurance verification page. The execution unit 1330 is configured to block current insurance verification if a screenshot image is stored in the album of the device and a generation moment of the screenshot image is later than the display moment of the insurance verification page.

Figure 14:
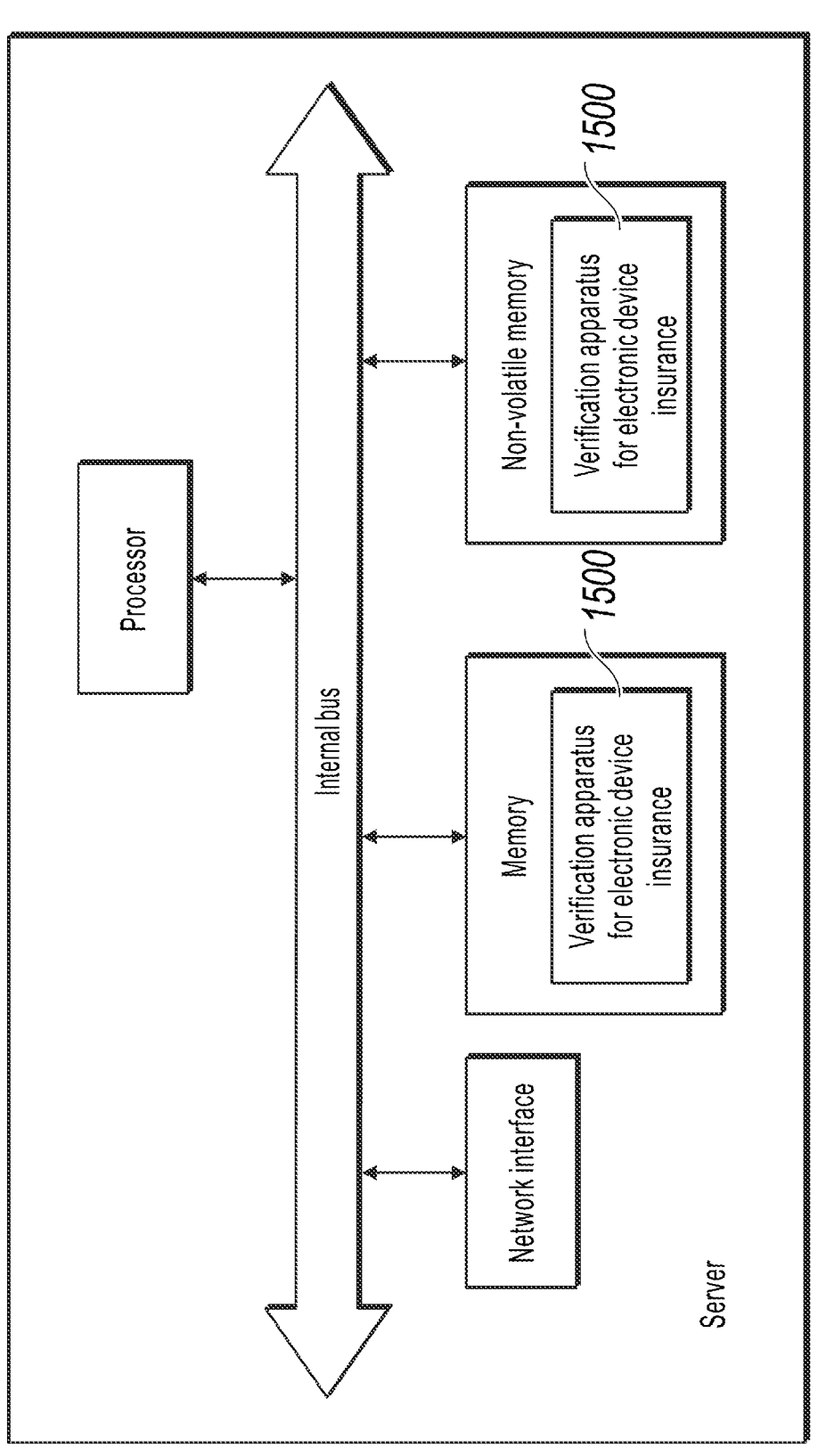
FIG. 14 is a diagram illustrating a hardware structure of a server in which a verification apparatus for electronic device insurance is located, according to an example embodiment of this specification.

FIG. 14 is a diagram illustrating a hardware structure of a server in which a verification apparatus for electronic device insurance is located, according to an example embodiment of this specification.

Figure 15:
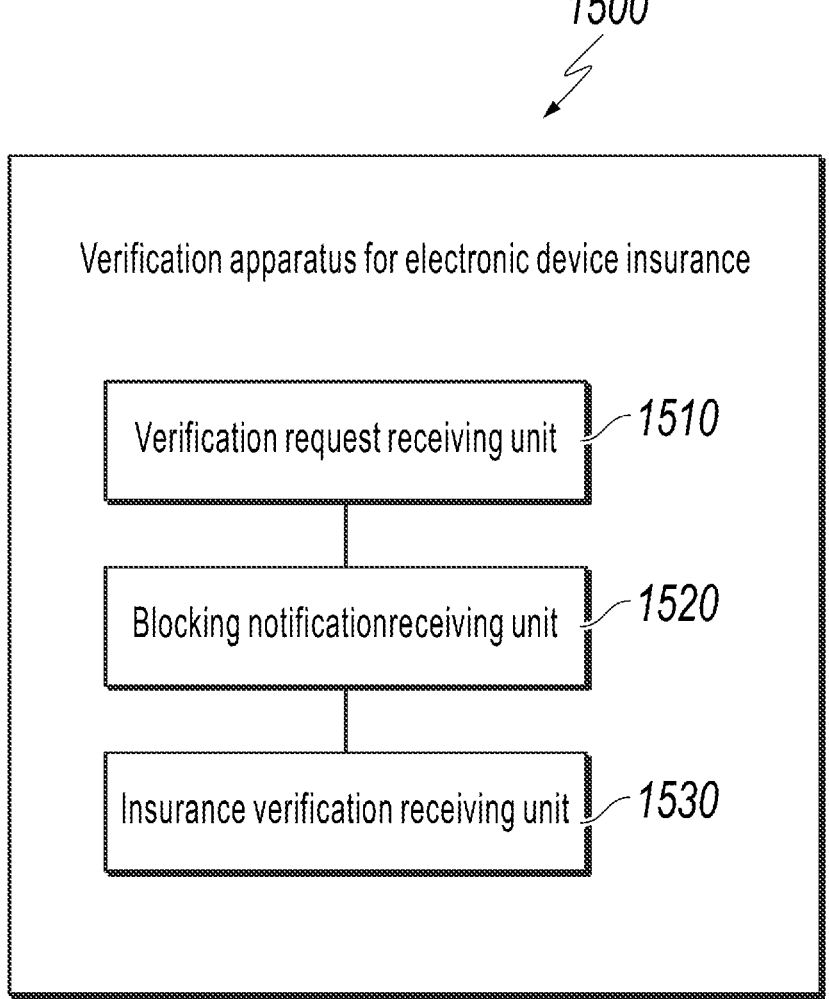
FIG. 15 is a block diagram illustrating another verification apparatus for electronic device insurance, according to an example embodiment of this specification.

FIG. 15 is a block diagram illustrating another verification apparatus for electronic device insurance, according to an example embodiment of this specification.

Referring to FIG. 15, a verification apparatus for electronic device insurance 1500 can be applied to the server shown in FIG. 14, and includes a verification request receiving unit 1510, a blocking notification receiving unit 1520, and an insurance verification blocking unit 1530.

The verification request receiving unit 1510 is configured to: after receiving an electronic device insurance verification request initiated by a user on an object device of insurance, send an insurance verification page display instruction to the object device, so that the object device displays an insurance verification page and monitors a sharing interface that is of the device and that is used for screen sharing, to determine whether a screen sharing behavior occurs after the device displays the insurance verification page. The blocking notification receiving unit 1520 is configured to receive a blocking notification sent by the object device when the object device determines that a screen sharing behavior occurs. The insurance verification blocking unit 1530 is configured to block current insurance verification.

Optionally, the insurance verification blocking unit 1530 includes: stopping sending update information of the insurance verification page to the object device.

Optionally, the insurance verification blocking unit 1530 includes: after a device image that is of the object device and that is sent by a verification auxiliary device is received, determining whether blocking information exists in the device image; and if blocking information exists in the device image, determining that verification fails.

For an implementation process of functions and roles of each unit in the apparatus, references can be made to an implementation process of corresponding steps in the above-mentioned method. Details are omitted here for simplicity.

Because the apparatus embodiments correspond to the method embodiments, for related parts, references can be made to related descriptions in the method embodiments. The apparatus embodiments described above are merely examples. The units described as separate parts can or do not have to be physically separate, and parts displayed as units can or do not have to be physical units, can be located at one location, or can be distributed on a plurality of network units. Some or all of the modules can be selected based on actual needs to achieve the objectives of the solutions of this specification. A person of ordinary skill in the art can understand and implement the embodiments of this application without creative efforts.

The system, apparatus, module, or unit illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending and receiving device, a game console, a tablet computer, a wearable device, or any combination of several of these devices.

Corresponding to the embodiments of the verification method for electronic device insurance, this specification further provides a verification apparatus for electronic device insurance. The apparatus includes a processor and a memory configured to store machine-executable instructions. The processor and the memory are usually connected to each other through an internal bus. In another possible implementation, the device may further include an external interface, to communicating with another device or component.

In this embodiment, machine-executable instructions that are stored in the memory and that correspond to electronic device insurance verification logic are read and executed, to enable the processor to perform the following operations: displaying an insurance verification page in response to an electronic device insurance verification request initiated by a user; monitoring a sharing interface that is of the device and that is used for screen sharing, to determine whether a screen sharing behavior occurs after the device displays the insurance verification page; and blocking current insurance verification if a screen sharing behavior occurs.

Optionally, when monitoring an interface that is of the device and that is used for screen sharing, to determine whether a screen sharing behavior occurs after the device displays the insurance verification page, the processor is enabled to perform the following operation: after it is detected that the interface that is of the device and that is used for screen sharing is invoked, determining that a screen sharing behavior occurs after the device displays the insurance verification page.

Optionally, the processor is enabled to perform the following operations: detecting upstream traffic of the device within a predetermined time period after the electronic device insurance verification request is initiated; and after it is detected that the interface that is of the device and that is used for screen sharing is invoked and it is detected that the upstream traffic exceeds a traffic threshold, determining that a screen sharing behavior occurs after the device displays the insurance verification page.

Optionally, when blocking current insurance verification, the processor is enabled to perform the following operation: outputting blocking information on the insurance verification page.

Optionally, the blocking information covers a part of the insurance verification page.

Optionally, when blocking current insurance verification, the processor is enabled to perform the following operation: adjusting a specified parameter of the sharing interface, to interfere with a screen sharing display.

Optionally, when blocking current insurance verification, the processor is enabled to perform the following operation: sending a blocking notification to a server, so that the server stops updating the insurance verification page after receiving the blocking notification.

Optionally, a monitoring opportunity of the sharing interface includes one or more of the following: a moment after the insurance verification page is displayed; and a moment after it is detected that a client that is on the device and that is configured to implement electronic device insurance verification switches from running in the background to running in the foreground.

Optionally, the sharing interface includes an interface for sharing a screen and/or an interface for taking a screenshot.

Corresponding to the embodiments of the verification method for electronic device insurance, this specification further provides a verification apparatus for electronic device insurance. In this embodiment, machine-executable instructions that are stored in the memory and that correspond to electronic device insurance verification logic are read and executed, to enable the processor to perform the following operations: displaying an insurance verification page in response to an electronic device insurance verification request initiated by a user; determining whether a screenshot image is stored in an album of the device and a generation moment of the screenshot image is later than a display moment of the insurance verification page; and blocking current insurance verification if a screenshot image is stored in the album of the device and a generation moment of the screenshot image is later than the display moment of the insurance verification page.

Corresponding to the embodiments of the verification method for electronic device insurance, this specification further provides a verification apparatus for electronic device insurance. In this embodiment, machine-executable instructions that are stored in the memory and that correspond to electronic device insurance verification logic are read and executed, to enable the processor to perform the following operations: after receiving an electronic device insurance verification request initiated by a user on an object device of insurance, sending an insurance verification page display instruction to the object device, so that the object device displays an insurance verification page and monitors a sharing interface that is of the device and that is used for screen sharing, to determine whether a screen sharing behavior occurs after the device displays the insurance verification page; receiving a blocking notification sent by the object device when the object device determines that a screen sharing behavior occurs; and blocking current insurance verification.

Optionally, when blocking current insurance verification, the processor is enabled to perform the following operations:

stopping sending update information of the insurance verification page to the object device.

Optionally, when blocking current insurance verification, the processor is enabled to perform the following operations: after a device image that is of the object device and that is sent by a verification auxiliary device is received, determining whether blocking information exists in the device image; and if blocking information exists in the device image, determining that verification fails.

Corresponding to the embodiments of the verification method for electronic device insurance, this specification further provides a computer-readable storage medium. The computer-readable storage medium stores a computer program, and when the program is executed by a processor, the following steps are implemented: displaying an insurance verification page in response to an electronic device insurance verification request initiated by a user; monitoring a sharing interface that is of the device and that is used for screen sharing, to determine whether a screen sharing behavior occurs after the device displays the insurance verification page; and blocking current insurance verification if a screen sharing behavior occurs.

Optionally, the monitoring an interface that is of the device and that is used for screen sharing, to determine whether a screen sharing behavior occurs after the device displays the insurance verification page includes: after it is detected that the interface that is of the device and that is used for screen sharing is invoked, determining that a screen sharing behavior occurs after the device displays the insurance verification page.

Optionally, the following steps are further included: detecting upstream traffic of the device within a predetermined time period after the electronic device insurance verification request is initiated; and after it is detected that the interface that is of the device and that is used for screen sharing is invoked and it is detected that the upstream traffic exceeds a traffic threshold, determining that a screen sharing behavior occurs after the device displays the insurance verification page.

Optionally, the blocking current insurance verification includes: outputting blocking information on the insurance verification page.

Optionally, the blocking information covers a part of the insurance verification page.

Optionally, the blocking current insurance verification includes: adjusting a specified parameter of the sharing interface, to interfere with a screen sharing display.

Optionally, the blocking current insurance verification includes: sending a blocking notification to a server, so that the server stops updating the insurance verification page after receiving the blocking notification.

Optionally, a monitoring opportunity of the sharing interface includes one or more of the following: a moment after the insurance verification page is displayed; and a moment after it is detected that a client that is on the device and that is configured to implement electronic device insurance verification switches from running in the background to running in the foreground.

Optionally, the sharing interface includes an interface for sharing a screen and/or an interface for taking a screenshot.

Corresponding to the embodiments of the verification method for electronic device insurance, this specification further provides a computer-readable storage medium. The computer-readable storage medium stores a computer program, and when the program is executed by a processor, the following steps are implemented: displaying an insurance verification page in response to an electronic device insurance verification request initiated by a user; determining whether a screenshot image is stored in an album of the device and a generation moment of the screenshot image is later than a display moment of the insurance verification page; and blocking current insurance verification if a screenshot image is stored in the album of the device and a generation moment of the screenshot image is later than the display moment of the insurance verification page.

Corresponding to the embodiments of the verification method for electronic device insurance, this specification further provides a computer-readable storage medium. The computer-readable storage medium stores a computer program, and when the program is executed by a processor, the following steps are implemented: after receiving an electronic device insurance verification request initiated by a user on an object device of insurance, sending an insurance verification page displaying instruction to the object device, so that the object device displays an insurance verification page and monitors a sharing interface that is of the device and that is used for screen sharing, to determine whether a screen sharing behavior occurs after the device displays the insurance verification page; receiving a blocking notification sent by the object device when the object device determines that a screen sharing behavior occurs; and blocking current insurance verification.

Optionally, the blocking current insurance verification includes: stopping sending update information of the insurance verification page to the object device.

Optionally, the blocking current insurance verification includes: after a device image that is of the object device and that is sent by a verification auxiliary device is received, determining whether blocking information exists in the device image; and if blocking information exists in the device image, determining that verification fails.

Some specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multitasking processing and parallel processing can also be possible or may be advantageous.

The above-mentioned descriptions are merely some embodiments of this specification, but are not intended to limit this specification. Any modification, equivalent replacement, or improvement made without departing from the spirit and principle of this specification shall fall within the protection scope of this specification.

What is claimed is:

1. A computer-implemented method, comprising:
in response to receiving an electronic device insurance verification request initiated by a user, displaying, by an electronic device, an insurance verification page;
monitoring, by the electronic device, a sharing interface of the electronic device, to determine whether screen sharing occurs after the electronic device displays the insurance verification page, wherein the monitoring the sharing interface comprises:
in response to determining that the sharing interface of the electronic device is invoked, determining that the screen sharing occurs after the electronic device displays the insurance verification page;
detecting, by the electronic device, upstream traffic of the electronic device within a predetermined time period after the electronic device insurance verification request is initiated; and
in response to determining that the sharing interface of the electronic device is invoked and the upstream traffic exceeds a traffic threshold, determining, by the electronic device, that the screen sharing occurs after the electronic device displays the insurance verification page; and
blocking, by the electronic device, insurance verification in response to determining that the screen sharing occurs.

2. The computer-implemented method according to claim 1, wherein blocking the insurance verification comprises:
outputting blocking information on the insurance verification page.

3. The computer-implemented method according to claim 2, wherein the blocking information covers a part of the insurance verification page.

4. The computer-implemented method according to claim 1, wherein blocking the insurance verification comprises:
adjusting a parameter of the sharing interface to interfere with the screen sharing.

5. The computer-implemented method according to claim 1, wherein blocking the insurance verification comprises:
sending a blocking notification to a server that stops the server from updating the insurance verification page.

6. The computer-implemented method according to claim 1, wherein monitoring the sharing interface occurs after the insurance verification page is displayed and a client configured to implement electronic device insurance verification switches from running in a background to running in a foreground.

7. The computer-implemented method according to claim 1, wherein the sharing interface comprises one or more of an interface for sharing a screen or an interface for taking a screenshot.

8. A non-transitory, computer-readable medium storing one or more instructions executable by a computer system to perform operations comprising:
in response to receiving an electronic device insurance verification request initiated by a user, displaying, by an electronic device, an insurance verification page;
monitoring, by the electronic device, a sharing interface of the electronic device, to determine whether screen sharing occurs after the electronic device displays the insurance verification page, wherein the monitoring the sharing interface comprises:
in response to determining that the sharing interface of the electronic device is invoked, determining that the screen sharing occurs after the electronic device displays the insurance verification page;
detecting, by the electronic device, upstream traffic of the electronic device within a predetermined time period after the electronic device insurance verification request is initiated; and
in response to determining that the sharing interface of the electronic device is invoked and the upstream traffic exceeds a traffic threshold, determining, by the electronic device, that the screen sharing occurs after the electronic device displays the insurance verification page; and
blocking, by the electronic device, insurance verification in response to determining that the screen sharing occurs.

9. The non-transitory, computer-readable medium according to claim 8, wherein blocking the insurance verification comprises:

outputting blocking information on the insurance verification page.

10. The non-transitory, computer-readable medium according to claim 9, wherein the blocking information covers a part of the insurance verification page.

11. The non-transitory, computer-readable medium according to claim 8, wherein blocking the insurance verification comprises:

adjusting a parameter of the sharing interface to interfere with the screen sharing.

12. The non-transitory, computer-readable medium according to claim 8, wherein blocking the insurance verification comprises:

sending a blocking notification to a server that stops the server from updating the insurance verification page.

13. The non-transitory, computer-readable medium according to claim 8, wherein monitoring the sharing interface occurs after the insurance verification page is displayed and a client configured to implement electronic device insurance verification switches from running in a background to running in a foreground.

14. The non-transitory, computer-readable medium according to claim 8, wherein the sharing interface comprises one or more of an interface for sharing a screen or an interface for taking a screenshot.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

in response to receiving an electronic device insurance verification request initiated by a user, displaying, by an electronic device, an insurance verification page;

monitoring, by the electronic device, a sharing interface of the electronic device, to determine whether screen sharing occurs after the electronic device displays the insurance verification page, wherein the monitoring the sharing interface comprises:

in response to determining that the sharing interface of the electronic device is invoked, determining that the screen sharing occurs after the electronic device displays the insurance verification page;

detecting, by the electronic device, upstream traffic of the electronic device within a predetermined time period after the electronic device insurance verification request is initiated; and in response to determining that the sharing interface of the electronic device is invoked and the upstream traffic exceeds a traffic threshold, determining, by the electronic device, that the screen sharing occurs after the electronic device displays the insurance verification page; and blocking, by the electronic device, insuranceverification in response to determining that the screen sharing occurs.

\* \* \* \* \*